US012517457B2

(12) United States Patent
Adams et al.

(10) Patent No.: US 12,517,457 B2
(45) **Date of Patent: *Jan. 6, 2026**

(54) TONER CONTAINER HAVING ELECTRICAL CONNECTORS OF DIFFERENT POSITIONS

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); David Lee Merrifield, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/804,460

(22) Filed: Aug. 14, 2024

(65) Prior Publication Data

US 2024/0402645 A1 Dec. 5, 2024

Related U.S. Application Data

(63) Continuation of application No. 17/894,595, filed on Aug. 24, 2022, now Pat. No. 12,092,990.

(51) Int. Cl.

*G03G 15/01* (2006.01)
*G03G 15/08* (2006.01)
*G03G 21/16* (2006.01)

(52) U.S. Cl.

CPC ..... *G03G 21/1652* (2013.01); *G03G 15/0121* (2013.01); *G03G 15/0875* (2013.01); *G03G 21/1676* (2013.01); *G03G 2215/068* (2013.01); *G03G 2215/0872* (2013.01)

(58) Field of Classification Search

CPC ........... G03G 15/0121; G03G 15/0863; G03G 15/0875; G03G 21/1652; G03G 21/1676; G03G 2215/068; G03G 2215/0872; G03G 2221/166

See application file for complete search history.

(56) References Cited

U.S. PATENT DOCUMENTS 8,948,660 B2 * 2/2015 Baker ................ G03G 15/0886 399/258
12,092,990 B2 * 9/2024 Adams ............... G03G 21/1652
2007/0189781 A1 * 8/2007 Katogi ............... G03G 15/0863 399/12

* cited by examiner

*Primary Examiner* — Sophia S Chen
(74) *Attorney, Agent, or Firm* — Justin M. Tromp

(57) ABSTRACT

A toner container for use in an image forming device according to one example embodiment includes a body having a reservoir for holding toner. The toner container includes an electrical connector having an electrical contact for contacting a corresponding electrical contact in the image forming device when the toner container is installed in the image forming device. The electrical connector is positioned in one of a plurality of predetermined positions relative to the body corresponding to at least one of a toner color and a toner type of the toner container for limiting installation of the toner container to one of a plurality of toner container receptacles in the image forming device corresponding to at least one of the toner color and the toner type of the toner container.

7 Claims, 11 Drawing Sheets

TONER CONTAINER HAVING ELECTRICAL CONNECTORS OF DIFFERENT POSITIONS

CROSS REFERENCES TO RELATED APPLICATIONS

This application is a continuation application of U.S. patent application Ser. No. 17/894,595, filed Aug. 24, 2022, entitled "Toner Containers Having Electrical Connectors of Different Positions."

BACKGROUND

1. Field of the Disclosure

The present disclosure relates generally to image forming devices and more particularly to a toner container electrical connector.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units that have a shorter lifespan than the image forming device. It is desired to communicate various operating parameters and usage information of the replaceable unit(s) to the image forming device for proper operation. For example, it may be desired to communicate such information as replaceable unit serial number, replaceable unit type, toner color, toner capacity, amount of toner remaining, license information, authentication information, etc. The replaceable unit(s) typically include processing circuitry configured to communicate with and respond to commands from a controller in the image forming device. The replaceable unit(s) also include memory associated with the processing circuitry that stores, for example, program instructions and information related to the replaceable unit. The processing circuitry and associated memory are typically mounted on a circuit board attached to the replaceable unit. The replaceable unit also includes one or more electrical contacts that mate with corresponding electrical contacts in the image forming device upon installation of the replaceable unit in the image forming device in order to facilitate communication between the processing circuitry of the replaceable unit and the controller of the image forming device. It is important to accurately position the electrical contacts of the replaceable unit relative to the corresponding electrical contacts of the image forming device in order to ensure a reliable connection between the processing circuitry of the replaceable unit and the controller of the image forming device when the replaceable unit is installed in the image forming device.

Some image forming devices may utilize more than one replaceable unit of a particular type. For example, an image forming device configured to print in color may include multiple replaceable units having substantially identical or nearly identical constructions with each replaceable unit containing a different color toner, such as cyan, yellow, magenta and black toner. In order to ensure proper installation and replacement of such replaceable units, each replaceable unit may include a keying feature or lockout feature that permits installation of the replaceable unit in a single receptacle within the image forming device corresponding to the toner color of the replaceable unit. For example, in an image forming device containing cyan, yellow, magenta and black toner containers, each toner container may include a tab positioned in one of four possible locations on the toner container that is received by a corresponding mating slot positioned in one of four possible locations on each toner container receptacle within the image forming device. If a user attempts to install a toner container in an incorrect receptacle, misalignment between the molded tab on the toner container and the mating slot of the receptacle will prevent installation of the toner container in the incorrect receptacle. In this manner, each toner container is only able to be installed in the correct receptacle in order to prevent incorrect installation of the toner container and cross contamination of toner colors.

SUMMARY

A toner container for use in an image forming device according to one example embodiment includes a body having a reservoir for holding toner. The toner container includes an electrical connector having an electrical contact for contacting a corresponding electrical contact in the image forming device when the toner container is installed in the image forming device. The electrical connector is positioned in one of a plurality of predetermined positions relative to the body corresponding to at least one of a toner color and a toner type of the toner container for limiting installation of the toner container to one of a plurality of toner container receptacles in the image forming device corresponding to at least one of the toner color and the toner type of the toner container.

Embodiments include those wherein the electrical contact of the toner container is accessible from below at a bottom of the body by the corresponding electrical contact in the image forming device when the toner container is installed in the image forming device. In some embodiments, a cavity is formed in the bottom of the body, and the electrical connector is positioned in the cavity.

Embodiments include those wherein the electrical contact of the toner container is electrically connected to processing circuitry on the toner container. In some embodiments, the electrical contact of the toner container is positioned on a printed circuit board that includes the processing circuitry.

Embodiments include those wherein the electrical connector is positioned in one of a plurality of predetermined orientations relative to the body corresponding to at least one of the toner color and the toner type of the toner container. In some embodiments, the electrical connector is positioned at one of a plurality of predetermined angles relative to the body corresponding to at least one of the toner color and the toner type of the toner container.

A replaceable unit for use in an image forming device according to one example embodiment includes a body and an electrical connector having an electrical contact for contacting a corresponding electrical contact in the image forming device when the replaceable unit is installed in the image forming device. The replaceable unit includes a plurality of positioning guides on the body. Each of the plurality of positioning guides is configured to receive the electrical connector for mounting the electrical connector on the replaceable unit. Each of the plurality of positioning guides is oriented at a distinct angle such that the electrical connector is selectably mountable on the replaceable unit in one of a plurality of angular orientations relative to the body.

Embodiments include those wherein the electrical contact of the toner container is accessible from below at a bottom of the body by the corresponding electrical contact in the image forming device when the toner container is installed in the image forming device.

In some embodiments, a cavity is formed in the bottom of the body, and the plurality of positioning guides are positioned in the cavity.

Embodiments include those wherein the electrical contact of the toner container is electrically connected to processing circuitry on the toner container. In some embodiments, the electrical contact of the toner container is positioned on a printed circuit board that includes the processing circuitry.

Embodiments include those wherein the plurality of positioning guides includes a plurality of positioning slots. In some embodiments, each of the plurality of positioning slots includes a first guide slot positioned to receive a first end portion of the electrical connector and a second guide slot positioned to receive a second end portion of the electrical connector.

A toner container for use in an image forming device according to another example embodiment includes a body having a top, a bottom, a front and a rear positioned between a first side and a second side of the body. The body has a reservoir for holding toner. A downward facing outlet port is positioned on the front of the body for exiting toner from the toner container. A cavity is formed in the bottom of the body. An electrical connector is positioned in the cavity and has an electrical contact for contacting a corresponding electrical contact in the image forming device when the toner container is installed in the image forming device. The electrical contact of the toner container is electrically connected to processing circuitry on the toner container. The electrical connector is positioned in one of a plurality of predetermined positions relative to the body corresponding to at least one of a toner color and a toner type of the toner container.

Embodiments include those wherein the electrical contact of the toner container is positioned on a printed circuit board that includes the processing circuitry.

Embodiments include those wherein the electrical connector is positioned in one of a plurality of predetermined orientations relative to the body corresponding to at least one of the toner color and the toner type of the toner container. In some embodiments, the electrical connector is positioned at one of a plurality of predetermined angles relative to the body corresponding to at least one of the toner color and the toner type of the toner container.

In some embodiments, a plurality of positioning guides are positioned on the body. Each of the plurality of positioning guides is configured to receive the electrical connector for mounting the electrical connector on the replaceable unit. Each of the plurality of positioning guides is oriented in a distinct orientation such that the electrical connector is selectably mountable on the replaceable unit in one of a plurality of predetermined orientations relative to the body. In some embodiments, each of the plurality of positioning guides is oriented at a distinct angle such that the electrical connector is selectably mountable on the replaceable unit in one of a plurality of predetermined angles relative to the body. In some embodiments, the plurality of positioning guides includes a plurality of positioning slots on the body. Each of the plurality of positioning slots may include a first guide slot positioned to receive a first end portion of the electrical connector and a second guide slot positioned to receive a second end portion of the electrical connector.

A method of assembling a toner container according to one example embodiment includes selecting a positioning guide among a plurality of positioning guides on a body of the toner container that corresponds with at least one of a toner color and a toner type of the toner container. Each of the plurality of positioning guides is positioned in a distinct orientation relative to the body of the toner container. An electrical connector having an electrical contact is installed on the selected positioning guide such that an orientation of the electrical connector relative to the body corresponds with at least one of the toner color and the toner type of the toner container.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
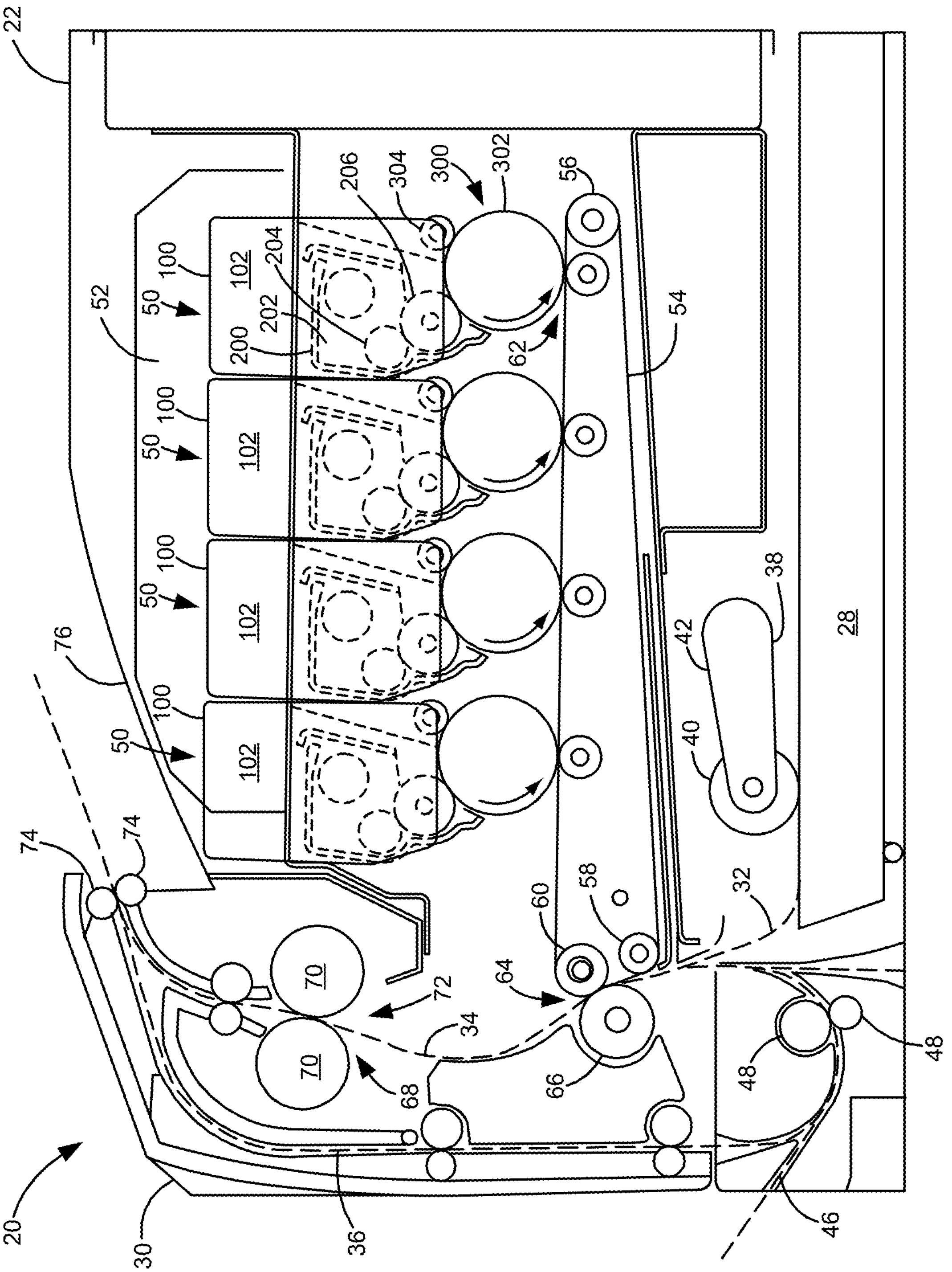
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper or any other desired substrate. Trays 28 are preferably removable for refilling. A control panel 30 may be located on housing 22. Using control panel 30, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll 40 positioned at the end of a pivotable arm 42. Roll 40 rotates to move the media sheet from tray 28 and into media path 32. The media sheet is then moved along media path 32 by various transport rollers. Media sheets may also be introduced into media path 32 by a manual feed 46 having one or more rolls 48.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50. PC drums 302 are mounted substantially parallel to each other. For purposes of clarity, developer unit 200, PC drum 302 and charging roll 304 are labeled on only one of the imaging stations 50. In the example embodiment illustrated, each imaging station 50 is substantially the same except for the color of toner.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image. Developer roll 206 then transfers toner to PC drum 302 to form a toner image. A metering device, such as a doctor blade, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a clockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along the media path 32 and into a fuser area 68. Fuser area 68 includes fusing rolls or belts 70 that form a nip 72 to adhere the toner image to the media sheet. The fused media sheet then passes through exit rolls 74 located downstream from fuser area 68. Exit rolls 74 may be rotated in either forward or reverse directions. In a forward direction, exit rolls 74 move the media sheet from simplex path 34 to an output area 76 of image forming device 20. In a reverse direction, exit rolls 74 move the media sheet into duplex path 36 for image formation on a second side of the media sheet.

Figure 2:
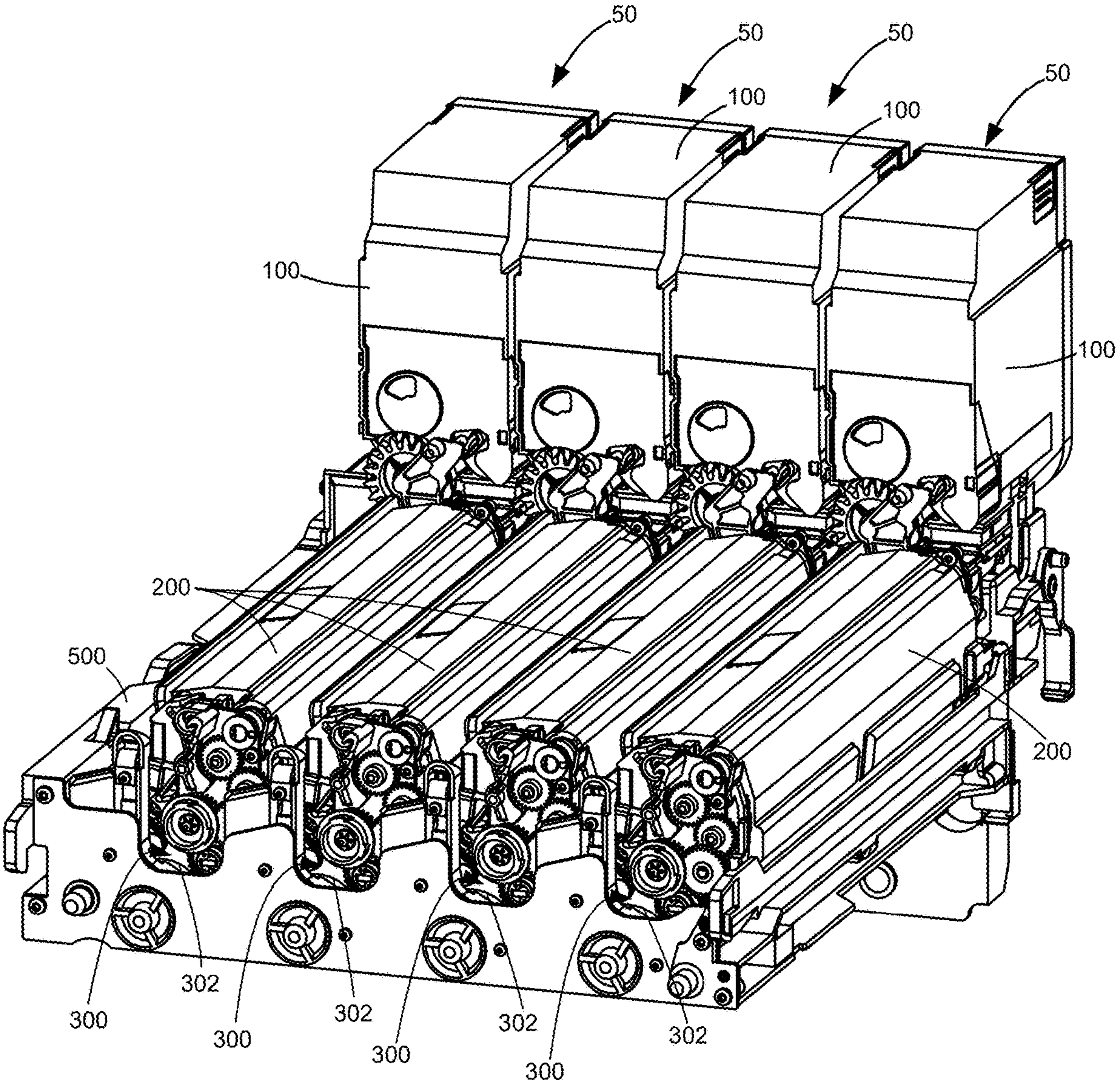
FIG. 2 is a perspective view of four imaging stations each having a toner cartridge and a developer unit for use with the image forming device according to one example embodiment.

A monocolor image forming device 20 may include a single imaging station 50, as compared to a color image forming device 20 that may include multiple imaging stations 50. FIG. 2 illustrates a set of four imaging stations 50 that each includes a respective toner cartridge 100, developer unit 200 and PC unit 300.

Figure 3:
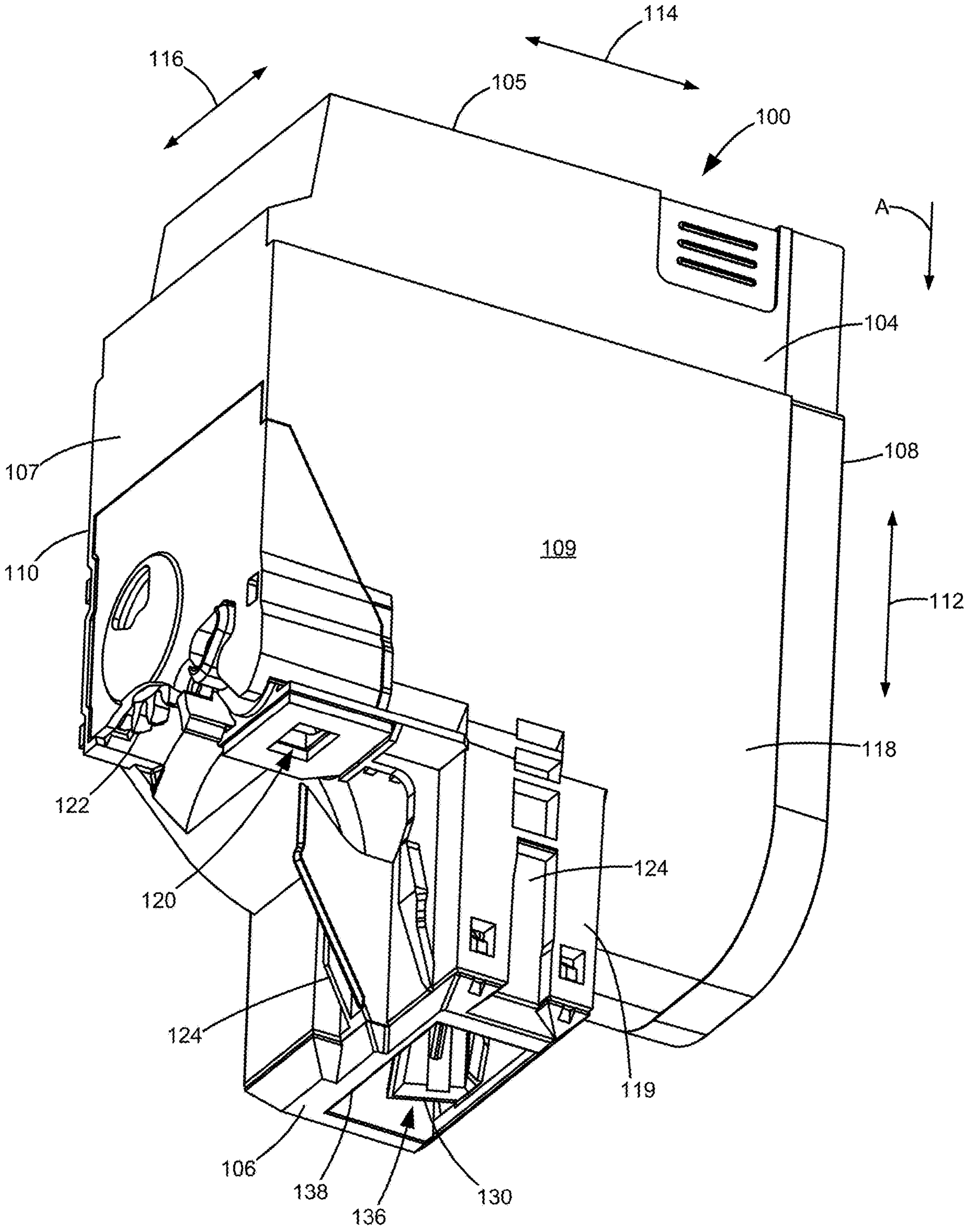
FIG. 3 is a perspective view of a toner cartridge according to one example embodiment.

FIG. 3 shows toner cartridge 100 according to one example embodiment. Toner cartridge 100 includes a body 104 housing toner reservoir 102 therein. Body 104 includes a top 105, a bottom 106, a front 107, a rear 108 and a pair of sides 109, 110. Body 104 has a height measured along a vertical dimension 112 of toner cartridge 100 between top 105 and bottom 106, a depth measured along a front-to-rear dimension 114 of toner cartridge 100 orthogonal to vertical dimension 112 between front 107 and rear 108, and a width measured along a side-to-side dimension 116 of toner cartridge 100 orthogonal to vertical dimension 112 and front-to-rear dimension 114 between side 109 and side 110. In the example embodiment illustrated, body 104 includes a main section 118 and an extension section 119. Extension section

119 is positioned at the bottom 106 of body 104. As illustrated in FIG. 3, in one example embodiment, a depth of extension section 119 along front-to-rear dimension 114 is less than a depth of main section 118. In one example embodiment, a height of extension section 119 along vertical dimension 112 is less than a height of main section 118.

Toner cartridge 100 includes an outlet port 120 for transferring toner to an inlet port of developer unit 200. In the example embodiment illustrated, outlet port 120 is formed as a downward facing opening on main section 118 on front 107 of body 104, roughly midway up the front 107 of body 104. Outlet port 120 may include a shutter that regulates whether toner is permitted to flow from reservoir 102 out of outlet port 120.

Toner cartridge 100 further includes a drive gear 122 that meshes with and receives rotational power from a corresponding gear in image forming device 20 when toner cartridge 100 is installed in image forming device 20 in order to provide rotational power to various toner agitators positioned within reservoir 102 for moving toner to outlet port 120. In the example embodiment illustrated, drive gear 122 is positioned on the front 107 of body 104, and a bottom portion of drive gear 122 mates with the corresponding gear in image forming device 20 when toner cartridge 100 is installed in image forming device 20.

Toner cartridge 100 may also include various alignment members 124 that align toner cartridge 100 with developer unit 200 during insertion of toner cartridge 100 in the direction shown by arrow A in FIG. 3. For example, alignment members 124 may include a combination of projections that project outward from sides 109, 110 of body 104 and/or elongated slots formed as depressions in sides 109, 110 that mate with corresponding slots and/or projections, respectively, to ensure accurate positioning of toner cartridge 100. For example, alignment members 124 help ensure that outlet port 120 mates with the inlet port of developer unit 200 and that drive gear 122 mates with the corresponding drive gear in image forming device 20.

Figure 4:
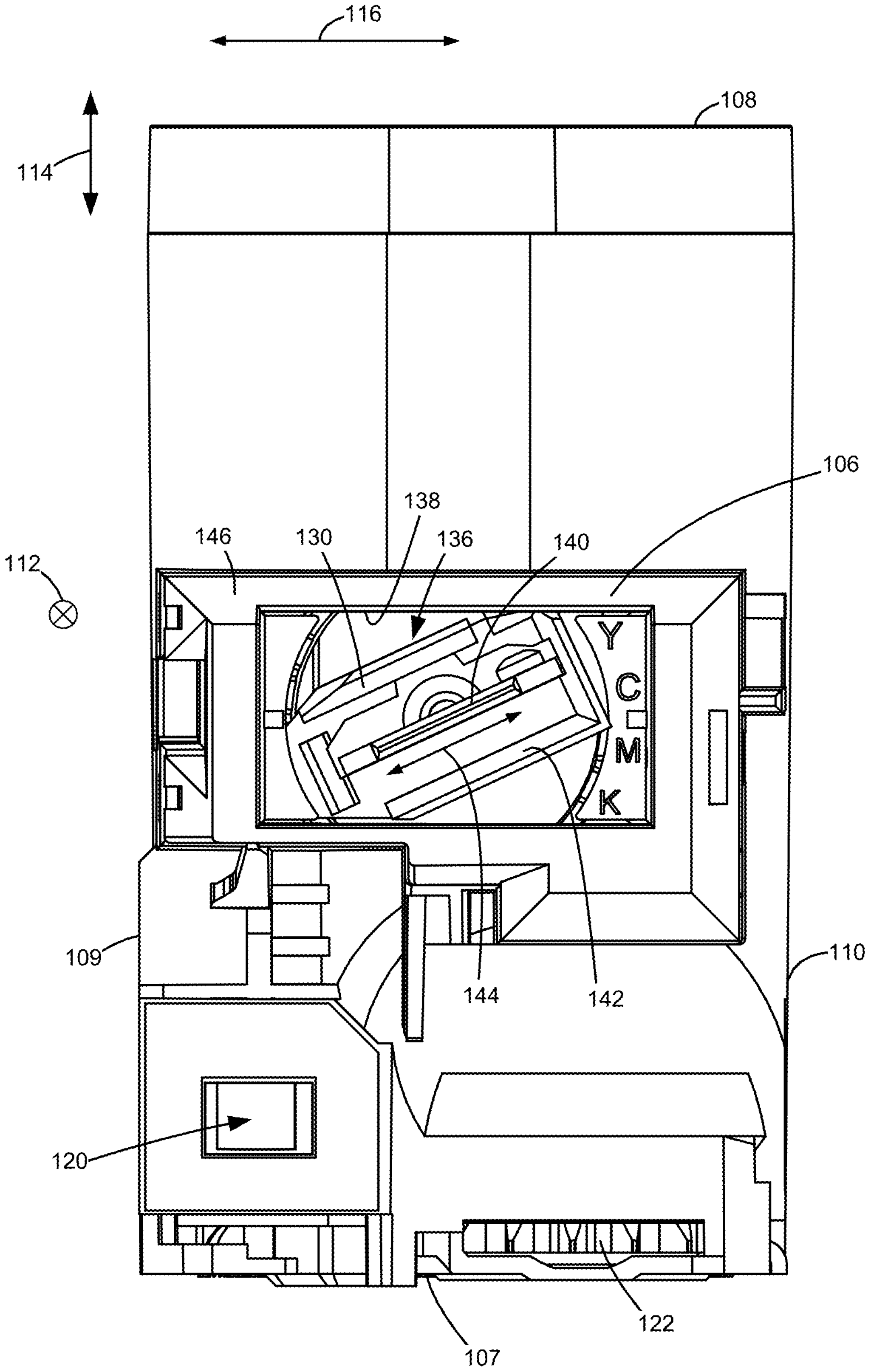
FIG. 4 is a bottom plan view of the toner cartridge shown in FIG. 3.
Figure 5:
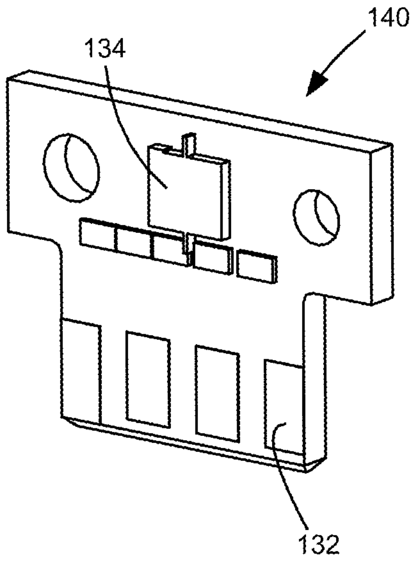
FIG. 5 is a perspective view of a printed circuit board having electrical contacts and processing circuitry for use with the toner cartridge shown in FIGS. 3 and 4 according to one example embodiment.

With reference to FIGS. 3-5, toner cartridge 100 includes an electrical connector 130 having electrical contacts 132 that are matable with corresponding electrical contacts in image forming device 20 when toner cartridge 100 is installed in image forming device 20 for facilitating a communication link between processing circuitry 134 of toner cartridge 100 and a controller of image forming device 20. In the example embodiment illustrated, electrical connector 130 and electrical contacts 132 are positioned in a recess or cavity 136 in the bottom 106 of body 104. An opening 138 at a bottom end of cavity 136 and a bottommost portion of body 104 permits a corresponding electrical connector in image forming device 20 to enter cavity 136 during downward insertion of toner cartridge 100 into image forming device 20.

Electrical contacts 132 are electrically connected to processing circuitry 134 mounted on toner cartridge 100. Processing circuitry 134 may provide authentication functions, safety and operational interlocks, operating parameters and/or usage information related to toner cartridge 100. Processing circuitry 134 may include hardware and/or software logic, as desired. For example, processing circuitry 134 may include an application-specific integrated circuit (ASIC) and/or a microprocessor or the like. Processing circuitry 134 may also include accompanying memory, for example, non-volatile and/or volatile memory, as desired.

In the example embodiment illustrated, electrical connector 130 includes a printed circuit board 140 positioned within cavity 136. In this embodiment, printed circuit board 140 includes processing circuitry 134, and electrical contacts 132 are positioned on printed circuit board 140 and exposed within cavity 136 permitting electrical contacts 132 to contact the corresponding electrical contacts in image forming device 20 when toner cartridge is installed in image forming device 20. However, printed circuit board 140 may be positioned in other suitable locations on toner cartridge 100, such as, for example, on the rear 108 of body 104, with the components of printed circuit board 140, such as processing circuitry 134, electrically connected to electrical contacts 132 positioned within cavity 136, such as, for example, by suitable traces, cables or wires.

In the example embodiment illustrated, electrical connector 130 includes a retainer 142. In this embodiment, printed circuit board 140 having electrical contacts 132 and processing circuitry 134 is mounted to retainer 142. Retainer 142 is positioned within cavity 136 on bottom 106 of body 104. As discussed in greater detail below, in some embodiments, retainer 142 of electrical connector 130, including electrical contacts 132, is free to flex and/or move to a limited degree relative to body 104 within cavity 136 in order to accommodate misalignment between electrical connector 130 and the corresponding electrical connector in image forming device 20 during insertion of toner cartridge 100 into image forming device 20 and to account for a tolerance stack up between electrical contacts 132 of toner cartridge 100 and the corresponding electrical contacts in image forming device 20.

As shown in FIG. 4, in the embodiment illustrated, a longitudinal dimension 144 of electrical connector 130 and electrical contacts 132 along a horizontal plane that is perpendicular to vertical dimension 112 of toner cartridge 100 is angled relative to front-to-rear dimension 114 and side-to-side dimension 116 of toner cartridge 100. In this embodiment, electrical contacts 132 are spaced from each other along longitudinal dimension 144. In some embodiments, a nominal position of longitudinal dimension 144 of electrical connector 130 and electrical contacts 132 from which retainer 142 of electrical connector 130 (and by extension, electrical contacts 132) may be free to flex and/or move relative to body 104 is angled relative to front-to-rear dimension 114 and side-to-side dimension 116 of toner cartridge 100.

Where image forming device 20 includes multiple toner cartridges 100 having substantially the same construction or multiple toner cartridges 100 that may be susceptible to installation by a user in an incorrect toner cartridge receptacle or receiving area, the electrical connector 130 and electrical contacts 132 of each toner cartridge 100 may be positioned uniquely in comparison with the other toner cartridges 100 of image forming device 20. For example, the electrical connector 130 and electrical contacts 132 of each toner cartridge 100 may be positioned in a distinct orientation, such as at a distinct angle, in comparison with the other toner cartridges 100 of image forming device 20. Electrical connectors within image forming device 20 that mate with electrical connectors 130 of toner cartridges 100 may be positioned in a manner corresponding to the distinct positions of the electrical connector 130 and electrical contacts 132 of each toner cartridge 100 such that each toner cartridge 100 is insertable into its correct toner cartridge receptacle or receiving area only and matable with its correct electrical connector within image forming device 20 only. In this manner, the position, such as the orientation, of the electrical connector 130 and electrical contacts 132 of each toner cartridge 100 serves as a keying or lockout feature to prevent incorrect installation of the toner cartridge 100 and cross contamination of toner colors.

Figure 6:
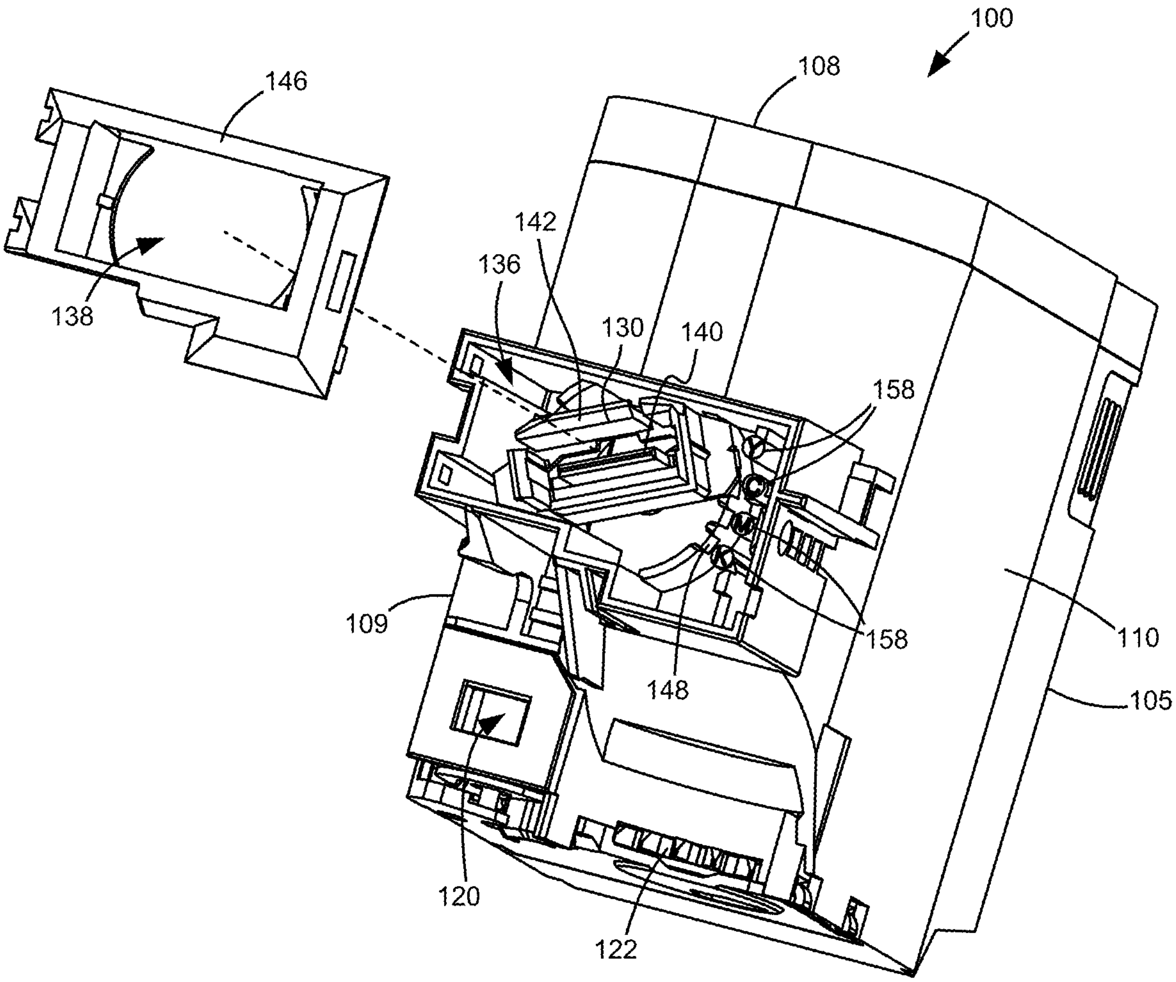
FIG. 6 is an exploded perspective view of a bottom portion of the toner cartridge shown in FIGS. 3 and 4 showing an electrical connector of the toner cartridge according to one example embodiment.

FIG. 6 shows bottom 106 of toner cartridge 100 with an end cap 146 of body 104 in exploded view to more clearly illustrate electrical connector 130 according to one example embodiment. In this embodiment, during manufacture of toner cartridge 100, after programming of processing circuitry 134, which may include writing a toner color of toner cartridge 100 to memory associated with processing circuitry 134, is completed, printed circuit board 140 having electrical contacts 132 and processing circuitry 134 thereon is mounted on retainer 142, and retainer 142 is selectably positioned in one of a plurality of positioning guides, such as, for example, positioning slots 148, within cavity 136 depending on the toner color intended for use in toner cartridge 100. In the example embodiment illustrated, retainer 142 is selectably positioned in one of four positioning slots 148 within cavity 136 corresponding to yellow, cyan, magenta and black toner, respectively. End cap 146 is then installed on body 104, for example, by ultrasonic welding, snap-fit engagement, or suitable fasteners. End cap 146 may aid in holding retainer 142 within cavity 136. End cap 146 also provides opening 138 into cavity 136 permitting the corresponding electrical connector in image forming device 20 to enter cavity 136 during downward insertion of toner cartridge 100 into image forming device 20. In some embodiments, end cap 146 may include positioning guides that selectably position retainer 142 within cavity 136.

Figure 7:
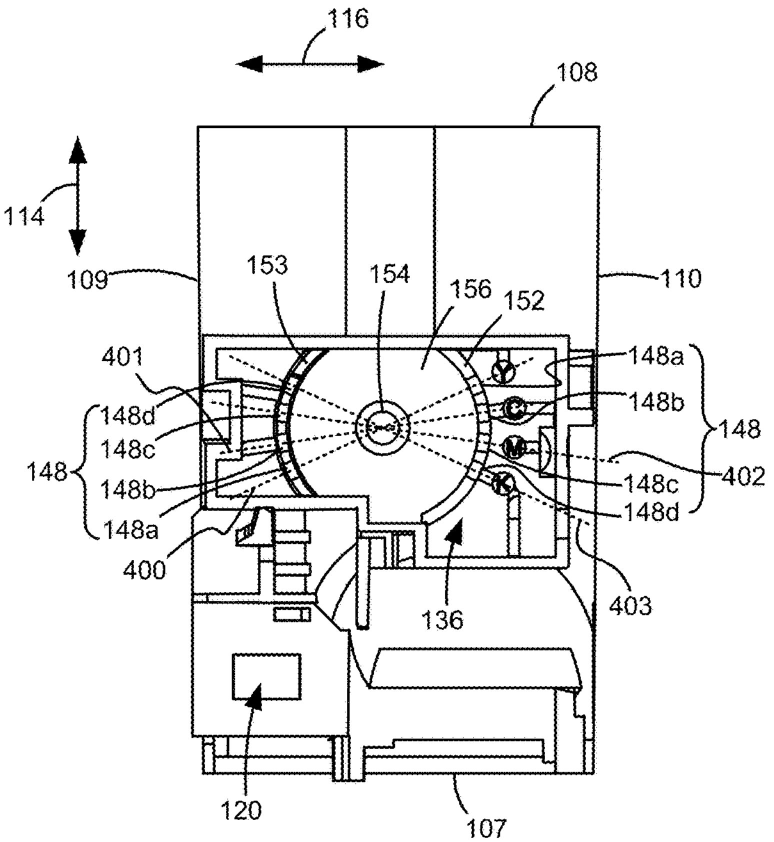
FIG. 7 is a bottom plan view of the toner cartridge shown in FIGS. 3, 4 and 6 with an end cap and the electrical connector of the toner cartridge omitted showing a plurality of positioning slots according to one example embodiment.
Figure 8:
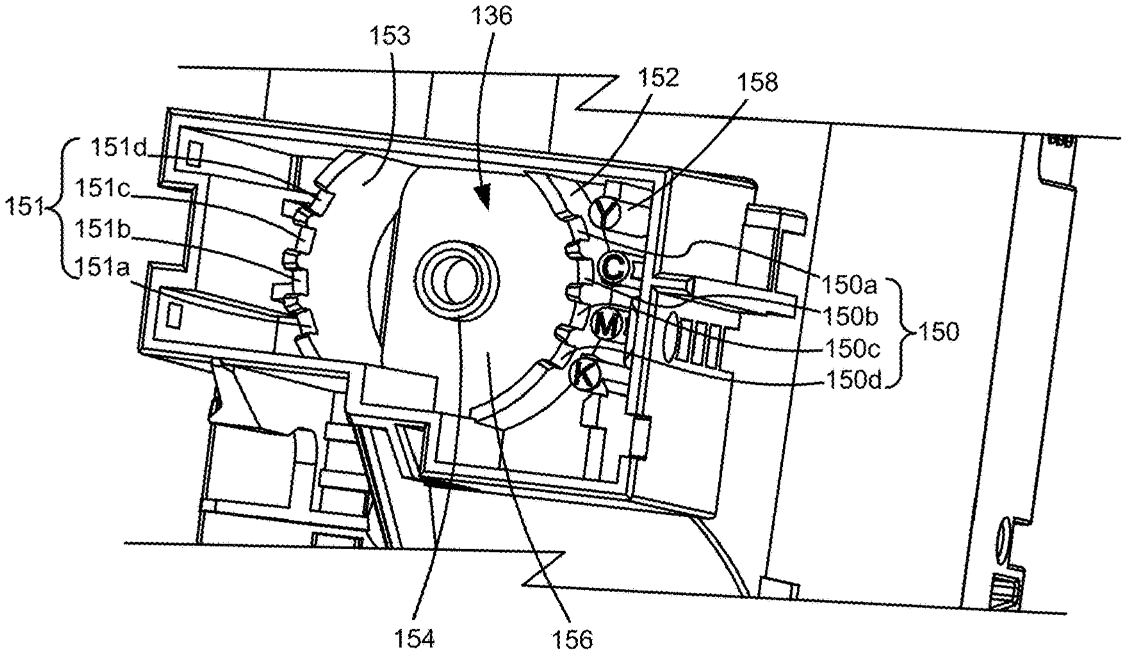
FIG. 8 is a bottom perspective view of the toner cartridge shown in FIGS. 3, 4, 6 and 7 with the end cap and the electrical connector of the toner cartridge omitted showing the plurality of positioning slots according to one example embodiment.

FIGS. 7 and 8 show positioning slots 148 in greater detail according to one embodiment. In the example embodiment illustrated, each positioning slot 148 includes a respective first guide slot 150 and second guide slot 151. Each first guide slot 150 is positioned to receive a first end portion of retainer 142, and each second guide slot 151 is positioned to receive a second end portion of retainer 142. In this embodiment, first and second guide slots 150, 151 are arranged to permit installation of electrical connector 130 in one of four predetermined positions at a predetermined angle relative to side-to-side dimension 116. The example embodiment illustrated includes a first positioning slot **148*a* formed by guide slots 150*a*, 151*a*, a second positioning slot 148*b* formed by guide slots 150*b*, 151*b*, a third positioning slot 148*c* formed by guide slots 150*c*, 151*c*, and a fourth positioning slot 148*d* formed by guide slots 150*d*, 151*d*. In the example embodiment illustrated, guide slots 150, 151 are formed as tapered indentations in bottom surfaces of respective arc-shaped support walls 152, 153**.

In the example embodiment illustrated, a central support 154 is positioned on a top surface 156 of cavity 136. As discussed in greater detail below, support 154 helps guide the movement of retainer 142 within cavity 136 during operation and helps ensure proper installation of retainer 142. The example embodiment illustrated also includes posts 158 spaced from and adjacent to guide slots 150 in a direction opposite corresponding guide slots 151. As discussed in greater detail below, posts 158 serve as an assembly aid by providing a visual identifier that denotes the toner color corresponding to each positioning slot 148 and by preventing an incorrect, reversed installation of retainer 142 within cavity 136.

As an example, in the embodiment illustrated, a nominal position of longitudinal dimension 144 of electrical connector 130 and electrical contacts 132 of a toner cartridge 100 having toner of a first color (e.g., yellow) may be angled 25 degrees relative to side-to-side dimension 116 as defined by positioning slot **148*a* and as illustrated by line 400 in FIG. 7. A nominal position of longitudinal dimension 144 of electrical connector 130 and electrical contacts 132 of a toner cartridge 100 having toner of a second color (e.g., cyan) may be angled 8.5 degrees relative to side-to-side dimension 116 as defined by positioning slot 148*b* and as illustrated by line 401 in FIG. 7. A nominal position of longitudinal dimension 144 of electrical connector 130 and electrical contacts 132 of a toner cartridge 100 having toner of a third color (e.g., magenta) may be angled −8.5 degrees relative to side-to-side dimension 116 as defined by positioning slot 148*c* and as illustrated by line 402 in FIG. 7. A nominal position of longitudinal dimension 144 of electrical connector 130 and electrical contacts 132 of a toner cartridge 100 having toner of a fourth color (e.g., black) may be angled −25 degrees relative to side-to-side dimension 116 as defined by positioning slot 148*d* and as illustrated by line 403 in FIG. 7. Preferably, in this example, the nominal angle of the electrical connector 130 of each toner cartridge 100 plus or minus any variability in the angle of the electrical connector 130 due to the range of motion of retainer 142, if any, does not overlap with the nominal angle plus or minus any variability of the electrical connector 130 of any other toner cartridge 100 such that toner cartridges 100 are installable in a single toner cartridge receptacle or receiving area only and matable with a single corresponding electrical connector in image forming device 20** only.

Figure 9:
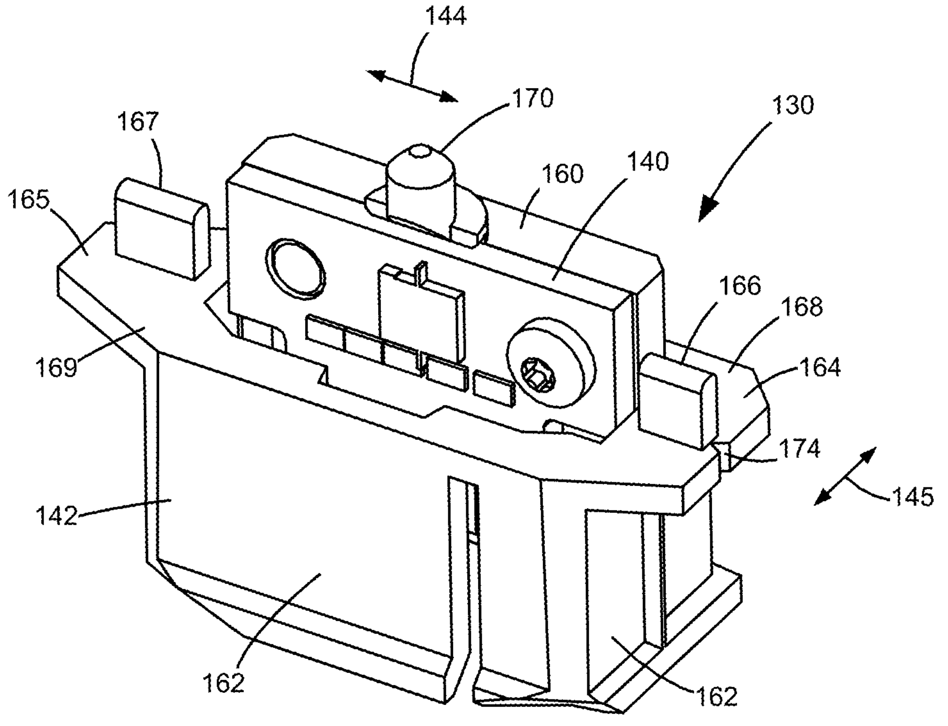
FIGS. 9 and 10 are perspective views of the electrical connector of the toner cartridge according to one example embodiment.
Figure 10:
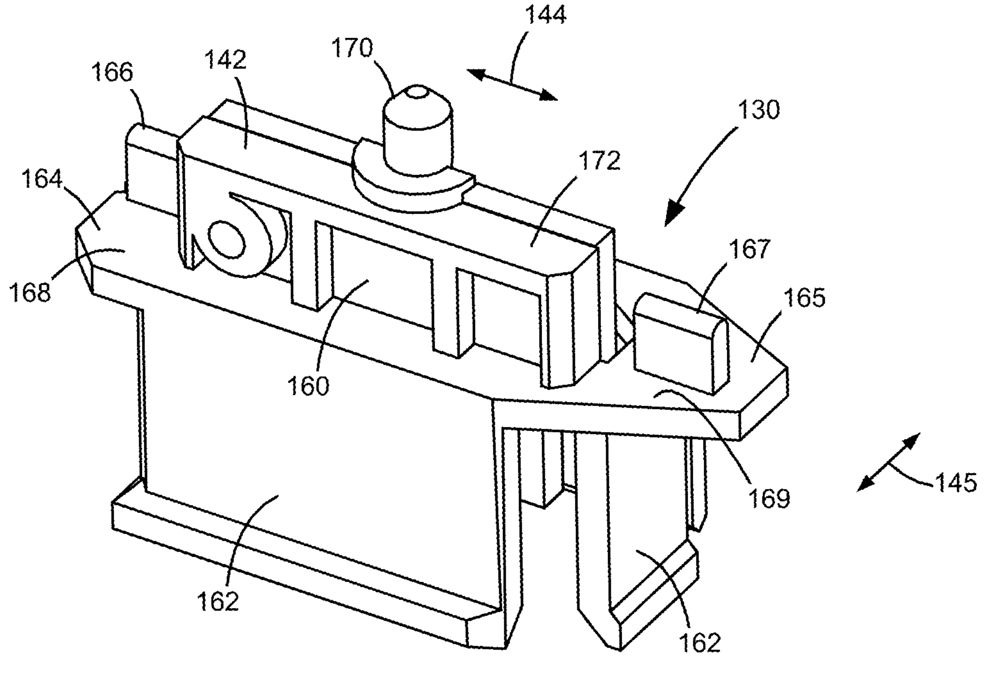

With reference to FIGS. 9 and 10, retainer 142 of electrical connector 130 includes a base 160. In the embodiment illustrated, printed circuit board 140 is mounted to base 160, for example, by friction fit, snap-fit engagement, male and female engagement features, adhesive, and/or suitable fasteners. Retainer 142 includes arms 162 extending downward in a cantilevered manner and surrounding printed circuit board 140 on each side with printed circuit board 140 accessible between arms 162 from below by the corresponding electrical connector in image forming device 20. Arms 162 are positioned to contact the corresponding electrical connector in image forming device 20 during insertion of toner cartridge 100 into image forming device 20. Contact between arms 162 of retainer 142 and the corresponding electrical connector in image forming device 20 in this embodiment guides movement of retainer 142 within cavity 136 permitting the contact between arms 162 of retainer 142 and the corresponding electrical connector in image forming device 20 to align electrical connector 130 of toner cartridge 100 with the corresponding electrical connector in image forming device 20 during insertion of toner cartridge 100 into image forming device 20. Arms 162 may be flexible relative to each other to accommodate the mating of arms 162 with the corresponding electrical connector in image forming device 20.

Retainer 142 also includes flanges 164, 165 extending in opposite directions along longitudinal dimension 144. In the example embodiment illustrated, flange 165 extends outward away from base 160 and printed circuit board 140 a greater distance along longitudinal dimension 144 than flange 164 extends outward away from base 160 and printed circuit board 140 in the opposite direction along longitudinal dimension 144. In the embodiment illustrated, a finger or tab 166, 167 extends upward from a top surface 168, 169 of each flange 164, 165. The example embodiment illustrated also includes a post 170 that extends upward from a top surface 172 of base 160. As discussed in greater detail below, tabs 166, 167 and post 170 aid in positioning retainer 142 in a desired positioning slot 148 within cavity 136.

With reference to FIGS. 6-10, in the example embodiment illustrated, during manufacture of toner cartridge 100, tabs 166, 167 are selectably positioned in the guide slots 150, 151 of a desired positioning slot 148 based on the toner color intended for use in toner cartridge 100. In this manner, engagement between tabs 166, 167 and guide slots 150, 151 of a particular positioning slot 148 (e.g., a yellow positioning slot 148*a*, a cyan positioning slot 148*b*, a magenta positioning slot 148*c* or a black positioning slot 148*d*) defines the orientation of electrical connector 130 and electrical contacts 132 relative to body 104 of toner cartridge 100 depending on the toner color intended for use in toner cartridge 100. In the example embodiment illustrated, when retainer 142 is installed in a particular positioning slot 148, a small indentation 174 along an edge of flange 164 is positioned adjacent to and aligned with a corresponding post 158. In this embodiment, each post 158 includes a visual identifier, such as a word, letter, icon and/or color, denoting the toner color corresponding to the guide slot 150 adjacent to each post 158. In this manner, posts 158 help an installation technician determine the correct positioning slot 148 to install electrical connector 130 in depending on the toner color intended for use in toner cartridge 100.

In the example embodiment illustrated, contact between tabs 166, 167 and the surfaces forming guide slots 150, 151 limits movement of electrical connector 130 within cavity 136 along a lateral dimension 145 of electrical connector 130 that is perpendicular to longitudinal dimension 144 of electrical connector 130 along the horizontal plane perpendicular to vertical dimension 112 of toner cartridge 100. The engagement between tabs 166, 167 and guide slots 150, 151 may also permit electrical connector 130 to rotate slightly about a rotational axis that is parallel to longitudinal axis 144. In the embodiment illustrated, contact between post 170 and support 154 also limits movement of electrical connector 130 within cavity 136 along longitudinal dimension 144 and lateral dimension 145. In this embodiment, contact between bottom surfaces of flanges 164, 165 and an inner surface of end cap 146 limits downward travel of electrical connector 130 within cavity 136, retaining electrical connector 130 within cavity 136. Further, in this embodiment, contact between tabs 166, 167 and the surfaces forming guide slots 150, 151 and/or between post 170 and support 154 limits upward travel of electrical connector 130 within cavity 136.

In the example embodiment illustrated, the length of flange 165 along longitudinal dimension 144 prevents retainer 142 from being incorrectly installed in a positioning slot 148 in a reversed orientation (rotated 180 degrees about post 170 from a correct orientation). If an installation technician attempts to install tab 166 in a guide slot 151 (instead of a guide slot 150) and tab 167 in a guide slot 150 (instead of a guide slot 151), flange 165 will contact a post 158 corresponding to guide slots 150, 151, preventing installation of tabs 166, 167 into guide slots 151, 150, respectively, thereby preventing reversed installation of retainer 142 in any positioning slot 148. Further, in the example embodiment illustrated, post 170 and support 154 prevent installation of tabs 166, 167 in a guide slot 150 of a first positioning slot 148 and a guide slot 151 of a second positioning slot 148. For example, if an installation technician attempts to install tab 166 in guide slot 150*a* of positioning slot 148*a* and tab 167 in guide slot 151*b* of positioning slot 148*b*, post 170 will be misaligned with support 154, blocking tabs 166, 167 from inserting into guide slots 150*a*, 151*b*.

Those skilled in the art will appreciate that the configuration of electrical connector 130, electrical contacts 132 and processing circuitry 134 discussed above with respect to FIGS. 4-10 is merely an example. Electrical connector 130, electrical contacts 132 and processing circuitry 134 may be configured and positioned on toner cartridge 100 in any suitable manner. For example, electrical connector 130 may be aligned to and mounted on toner cartridge 100 by any suitable means.

Figure 11:
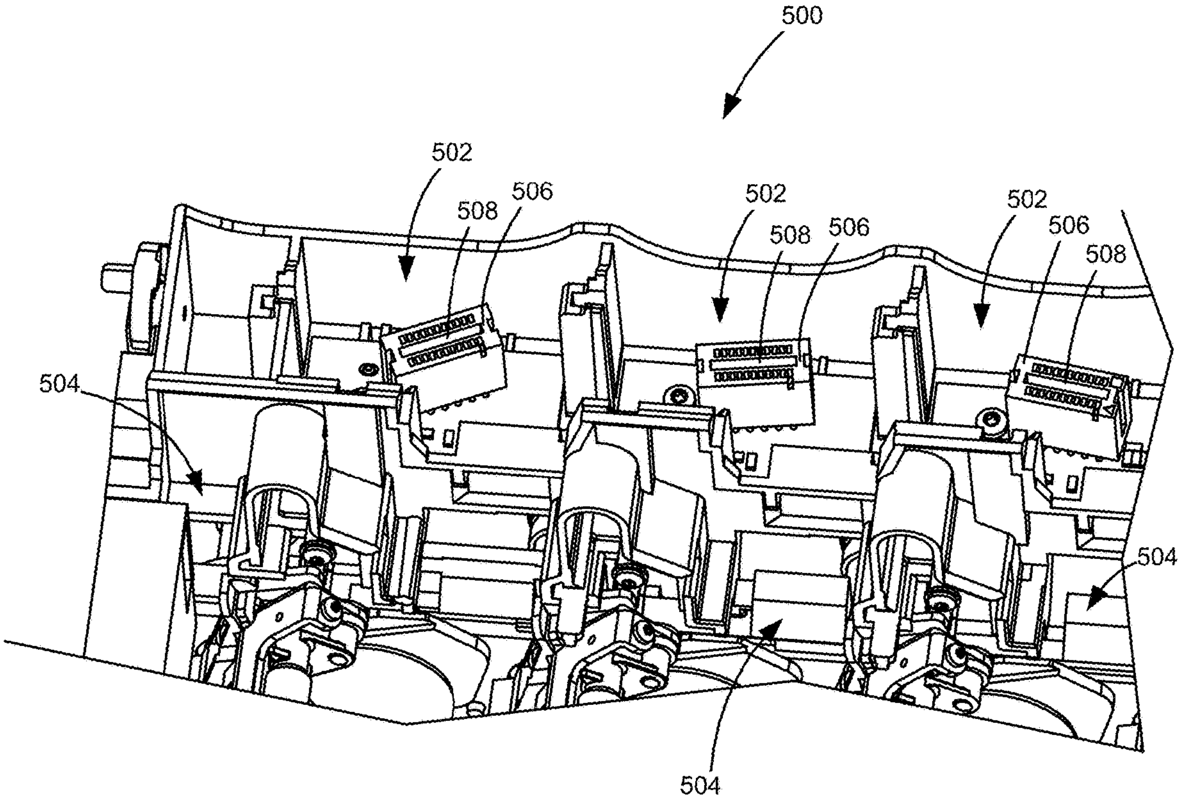
FIG. 11 is a perspective view of an imaging basket having a plurality of toner cartridge receptacles according to one example embodiment.

FIG. 11 shows an imaging unit, such as an imaging basket 500, for use in image forming device 20 according to one example embodiment. In this embodiment, imaging basket 500 includes a plurality of toner cartridge receptacles 502 that each retain a respective toner cartridge 100. Imaging basket 500 may also include a plurality of developer unit receptacles 504 that each retain a respective developer unit 200 or a combined developer unit 200 and PC unit 300. In some embodiments, imaging basket 500 is replaceable by a user. For example, imaging basket 500 may include PC units 300 attached thereto such that replacement of PC units 300 requires replacement of imaging basket 500. In this embodiment, each toner cartridge 100 and developer unit 200 may be separately replaceable, either individually or as a combined replaceable unit, from imaging basket 500. In other embodiments, imaging basket 500 is attached to image forming device 20 and not intended as a user-replaceable unit. In this embodiment, each toner cartridge 100, developer unit 200 and PC unit 300 may be separately replaceable, individually or as one or more combined replaceable units, from imaging basket 500.

In the example embodiment illustrated, each toner cartridge receptacle 502 includes an electrical connector 506 having electrical contacts 508 that are matable with electrical contacts 132 of the electrical connector 130 of a corresponding toner cartridge 100 when toner cartridge 100 is installed in toner cartridge receptacle 502 of image forming device 20 as discussed above. Electrical connectors 506 and electrical contacts 508 of each toner cartridge receptacle 502 are oriented, such as angled, in a manner that corresponds with electrical contacts 132 of the electrical connector 130 of the corresponding toner cartridge 100 intended for use in each toner cartridge receptacle 502 based on the toner color intended for use in each toner cartridge 100 and corresponding developer unit 200. In this embodiment, the electrical connector 506 and electrical contacts 508 of each toner cartridge receptacle 502 are positioned at a distinct angle in comparison with the other toner cartridge receptacles 502 of imaging basket 500 such that each toner cartridge receptacle 502 is configured to receive only the toner cartridge 100 having the toner color intended for use in the toner cartridge receptacle 502.

Figure 12:
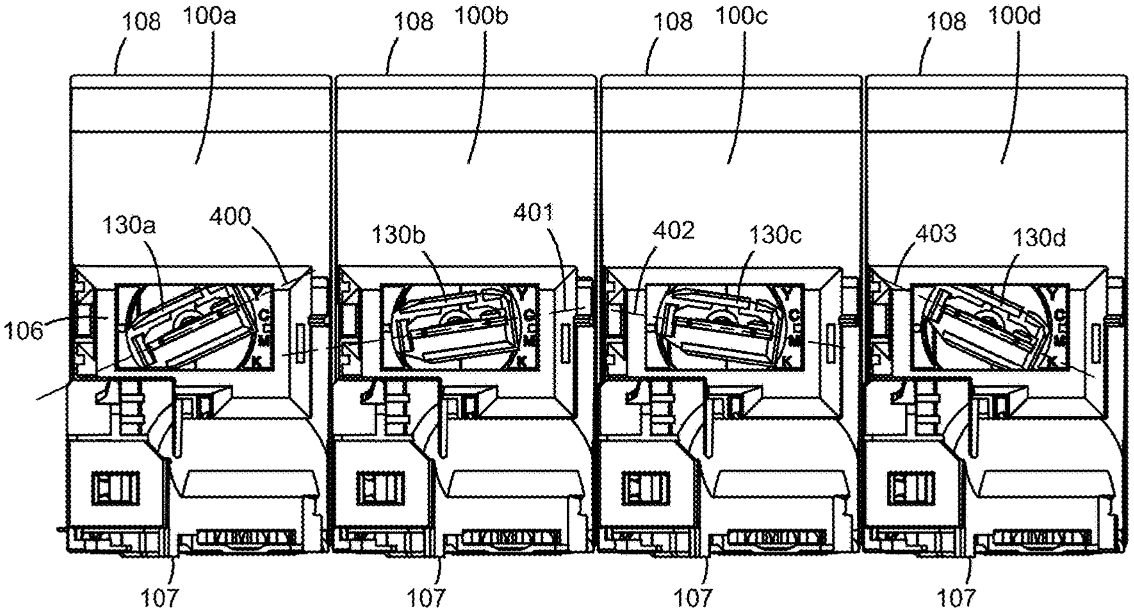
FIG. 12 is a bottom plan view of a set of four toner cartridges for use in the image forming device according to one example embodiment.
Figure 13:
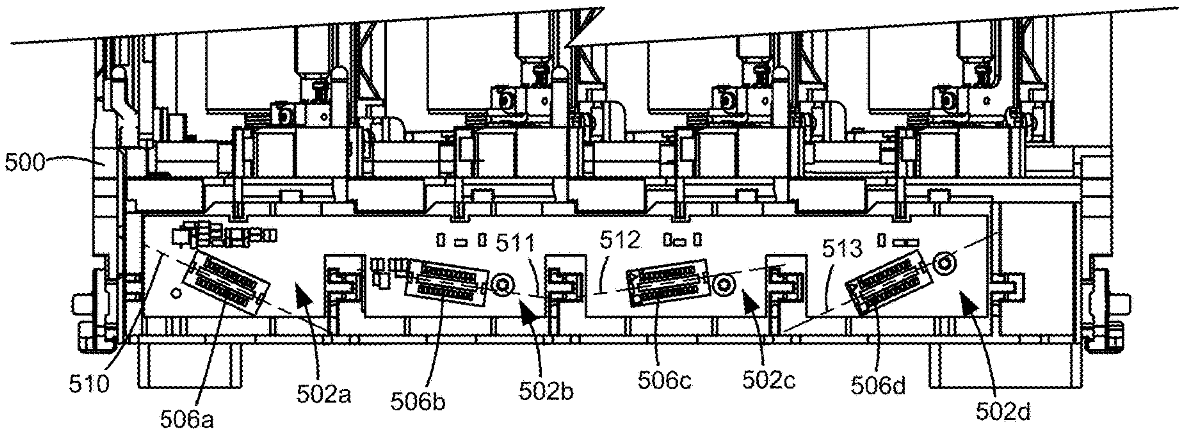
FIG. 13 is a top plan view of four toner cartridge receptacles of the imaging basket that are configured to receive the toner cartridges shown in FIG. 12 according to one example embodiment.

FIGS. 12 and 13 show four toner cartridges 100 and corresponding toner cartridge receptacles 502 according to one example embodiment. Toner cartridges 100 shown in FIG. 12 each have an electrical connector 130 positioned at a distinct angle in comparison with the electrical connectors 130 of the other toner cartridges 100. Similarly, toner cartridge receptacles shown in FIG. 13 each have an electrical connector 506 positioned at a distinct angle in comparison with the electrical connectors 506 of the other toner cartridge receptacles 502.

Specifically, the example embodiment illustrated in FIG. 12 includes a first toner cartridge 100*a* containing yellow toner, a second toner cartridge 100*b* containing cyan toner, a third toner cartridge 100*c* containing magenta toner and a fourth toner cartridge 100*d* containing black toner. In this embodiment, toner cartridge 100*a* includes an electrical connector 130*a* positioned at a first angle as illustrated by line 400; toner cartridge 100*b* includes an electrical connector 130*b* positioned at a second angle as illustrated by line 401; toner cartridge 100*c* includes an electrical connector 130*c* positioned at a third angle as illustrated by line 402; and toner cartridge 100*d* includes an electrical connector 130*d* positioned at a fourth angle as illustrated by line 403. Similarly, the example embodiment illustrated in FIG. 13 includes a first toner cartridge receptacle 502*a* configured to receive toner cartridge 100*a*, a second toner cartridge receptacle 502*b* configured to receive toner cartridge 100*b*, a third toner cartridge receptacle 502*c* configured to receive toner cartridge 100*c* and a fourth toner cartridge receptacle 502*d* configured to receive toner cartridge 100*d*. In this embodiment, toner cartridge receptacle 502*a* includes an electrical connector 506*a* positioned at a first angle illustrated by line 510; toner cartridge receptacle 502*b* includes an electrical connector 506*b* positioned at a second angle illustrated by line 511; toner cartridge receptacle 502*c* includes an electrical connector 506*c* positioned at a third angle illustrated by line 512; and toner cartridge receptacle 502*d* includes an electrical connector 506*d* positioned at a fourth angle illustrated by line 513. As shown in FIGS. 12 and 13, the angles of electrical connectors 506*a*, 506*b*, 506*c*, 506*d* correspond to the angles of electrical connectors 130*a*, 130*b*, 130*c*, 130*d*, respectively, such that toner cartridge receptacles 502*a*, 502*b*, 502*c*, 502*d* are configured to receive toner cartridges 100*a*, 100*b*, 100*c*, 100*d*, respectively.

Figure 14:
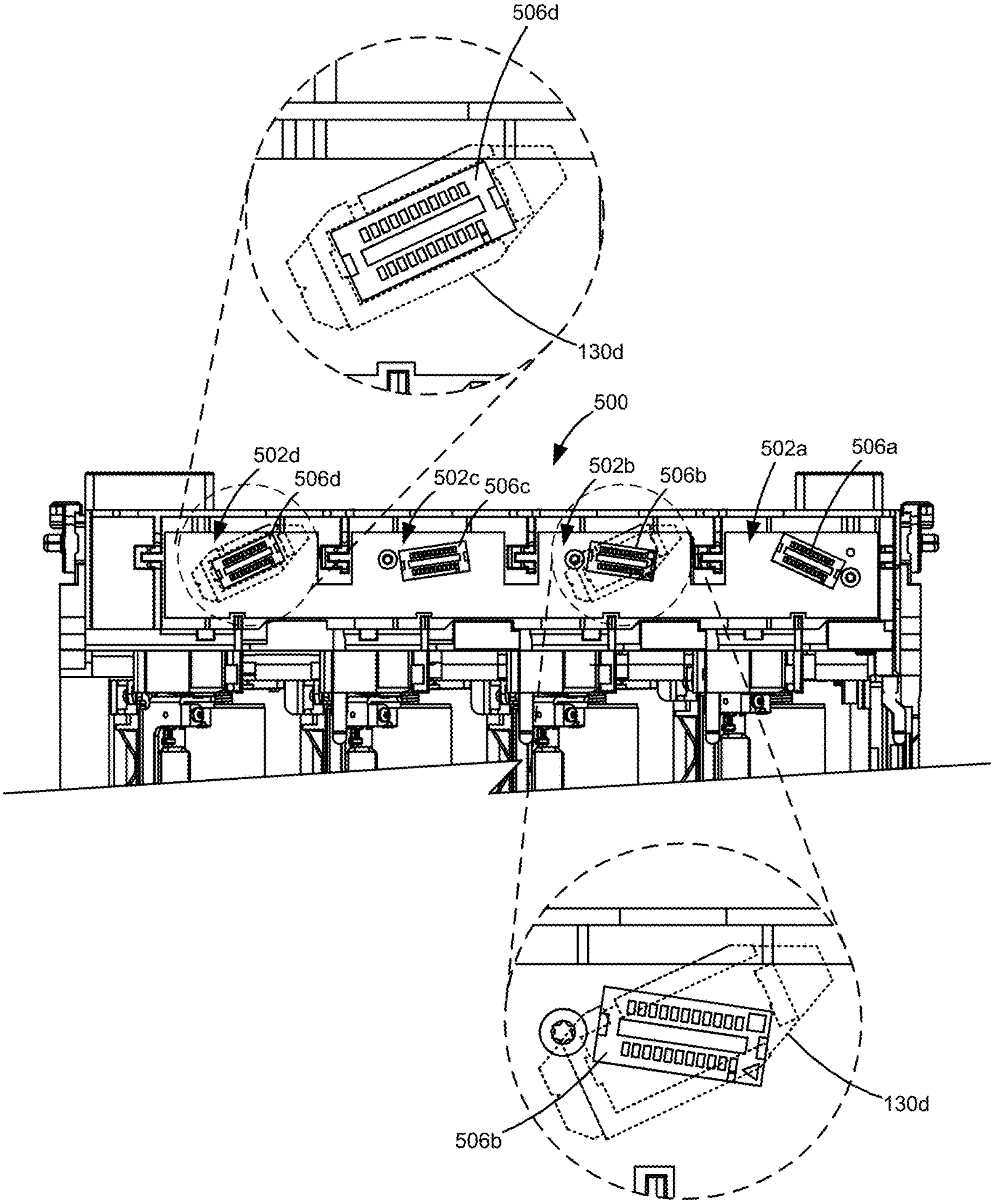
FIG. 14 is a top plan view of the toner cartridge receptacles of the imaging basket schematically showing an aligned toner cartridge electrical connector and a misaligned toner cartridge electrical connector according to one example embodiment.

FIG. 14 shows toner cartridge receptacles 502*a*, 502*b*, 502*c*, 502*d* having electrical connectors 506*a*, 506*b*, 506*c*, 506*d*. When a user installs toner cartridge 100*d* having electrical connector 130*d* (illustrated schematically in dashed line in FIG. 14) in the correct toner cartridge receptacle 502*d*, electrical connector 130*d* of toner cartridge 100*d* mateably receives electrical connector 506*d*, permitting full insertion of toner cartridge 100*d* into toner cartridge receptacle 502*d*. If, on the other hand, a user attempts to install toner cartridge 100*d* having electrical connector 130*d* in an incorrect toner cartridge receptacle 502, such as toner cartridge receptacle 502*b*, electrical connector 130*d* of toner cartridge 100*d* will be misaligned with the electrical connector 506 of the incorrect toner cartridge receptacle 502, blocking insertion of toner cartridge 100*d* into the toner cartridge receptacle 502, as illustrated by the misalignment between electrical connector 506*b* and electrical connector 130*d* (illustrated schematically in dashed line in FIG. 14).

Those skilled in the art will appreciate that the configuration of imaging basket 500 and toner cartridges 100 discussed above is merely an example. For example, toner cartridges 100 may be installed and retained in a toner cartridge receptacle or receiving area of image forming device 20 other than an imaging basket. Further, although the example embodiments discussed above include an electrical connector 130 that may be flexible and/or movable relative to body 104 of toner cartridge 100, in other embodiments, electrical connector 130 is fixed relative to body 104 of toner cartridge 100, and electrical connector 506 may be flexible and/or movable relative to imaging basket 500. In addition, although the example embodiments discussed above include a male electrical connector 506 of toner cartridge receptacle 502 that is received within arms 162 of a female electrical connector 130 of toner cartridge 100, this configuration may be reversed, or other configurations may be used, as desired.

Although the example embodiment shown in FIG. 2 includes toner cartridges 100, developer units 200 and PC units 300 positioned in separate replaceable units, it will be appreciated that the replaceable unit(s) of image forming device 20 may employ any suitable configuration as desired. For example, in one embodiment, the main toner supply for image forming device 20, developer unit 200 and PC unit 300 are combined in a separate replaceable unit for each color toner. In another embodiment, the main toner supply for image forming device 20 and developer unit 200 are provided in a first replaceable unit and PC unit 300 is provided in a second replaceable unit. Other combinations are possible without departing from the scope of the present disclosure. Further, although the example embodiments discussed above include the electrical connectors and electrical contacts of each toner cartridge positioned in a distinct position, such as orientation, in order to provide a keying or lockout feature based on the toner color intended for use in the toner cartridge, it will be appreciated that any replaceable unit, such as toner cartridges, developer units and/or PC units, may include electrical connectors and/or electrical contacts positioned in distinct positions in order to distinguish each unit based on toner color or other characteristics (e.g., toner type) of each unit.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:
- a body having a reservoir for holding toner;
- an electrical connector having an electrical contact for contacting a corresponding electrical contact in the image forming device when the toner container is installed in the image forming device; and
- a plurality of positioning guides on the body, each of the plurality of positioning guides is configured to receive the electrical connector for mounting the electrical connector on the toner container, each of the plurality of positioning guides is positioned in a distinct orientation such that the electrical connector is selectably mountable on the toner container in one of a plurality of orientations relative to the body corresponding to at least one of a toner color and a toner type of the toner container.

2. The toner container of claim 1, wherein the electrical contact of the toner container is accessible from below at a bottom of the body by the corresponding electrical contact in the image forming device when the toner container is installed in the image forming device.

3. The toner container of claim 1, further comprising a cavity formed in the bottom of the body, wherein the plurality of positioning guides are positioned in the cavity.

4. The toner container of claim 1, wherein the electrical contact of the toner container is electrically connected to processing circuitry on the toner container.

5. The toner container of claim 4, wherein the electrical contact of the toner container is positioned on a printed circuit board that includes the processing circuitry.

6. The toner container of claim 1, wherein the plurality of positioning guides includes a plurality of positioning slots.

7. The toner container of claim 6, wherein each of the plurality of positioning slots includes a first guide slot positioned to receive a first end portion of the electrical connector and a second guide slot positioned to receive a second end portion of the electrical connector.

* * * * *